(12) United States Patent
Hackemer (10) Patent No.: US 11,693,223 B2
(45) Date of Patent: Jul. 4, 2023

(54) AUTOFOCUSING MICROSCOPE OBJECTIVE

(71) Applicant: QIOPTIQ PHOTONICS GMBH & CO. KG, Göttingen (DE)

(72) Inventor: Witold Hackemer, Göttingen (DE)

(73) Assignee: Qioptiq Photonics GmbH & Co. KG, Göttingen (DE)

( * ) Notice: Subject to any disclaimer, the term of this patent is extended or adjusted under 35 U.S.C. 154(b) by 33 days.

(21) Appl. No.: 17/401,861

(22) Filed: Aug. 13, 2021

(65) Prior Publication Data

US 2022/0057616 A1    Feb. 24, 2022

(30) Foreign Application Priority Data

Aug. 21, 2020   (EP) .................................. 20192230

(51) Int. Cl.
| | | |
|---|---|---|
| *G01B 21/24* | (2006.01) | |
| *G02B 3/14* | (2006.01) | |
| *G02B 21/36* | (2006.01) | |
| *G02B 9/64* | (2006.01) | |
| *G02B 21/24* | (2006.01) | |

(52) U.S. Cl.
CPC ............ *G02B 21/245* (2013.01); *G02B 3/14* (2013.01); *G02B 21/365* (2013.01); *G02B 9/64* (2013.01)

(58) Field of Classification Search
CPC ...... G02B 21/245; G02B 3/14; G02B 21/365; G02B 9/64; G02B 21/02
See application file for complete search history.

(56) References Cited

U.S. PATENT DOCUMENTS 10,274,712 B2 * 4/2019 Doric .................. A61B 5/0071
10,466,461 B2 * 11/2019 Lukes ..................... G02B 5/04
2008/0297911 A1 12/2008 Christenson et al.
2011/0149407 A1 6/2011 Dharmatilleke et al.

OTHER PUBLICATIONS

Kanhere, et al. "Remote Axial Tuning in Microscopy Utilizing Hydrogel-Driven Tunable Liquid Lens," Journal of Microeletromechanical Systems, vol. 25, No. Apr. 2, 2016.
Extended European Search Report for application 20192230.9, dated Feb. 1, 2021.

* cited by examiner

*Primary Examiner* — Seung C Sohn
(74) *Attorney, Agent, or Firm* — Wolf, Greenfield & Sacks, P.C.

(57) ABSTRACT

The invention relates to an autofocusable microscope objective having an optical system of a plurality of optical components each formed by a lens or lens group. Here, one of the plurality of optical components is a liquid lens to effect autofocusing of the microscope objective, and the optical system is formed as a stationary system.

20 Claims, 3 Drawing Sheets

AUTOFOCUSING MICROSCOPE OBJECTIVE

CROSS-REFERENCE TO RELATED APPLICATIONS

This application claims the benefit of European patent application number 20192230.9, filed Aug. 21, 2020, entitled "Autofocusable microscope objective," which is incorporated by reference herein in its entirety.

FIELD OF THE INVENTION

The present invention generally relates to optics, and specifically relates to an autofocusable microscope objective.

BACKGROUND OF THE INVENTION

Microscope objectives are distinguished between objectives with finite tube length (finite optics) and objectives with "infinite" tube length (infinite optics). If plano-optical components, such as filter disks, prisms, plano-optical illuminators, polarization-optical elements, are to be introduced into the image-side beam path of the objective when examining specimens, they cause a shift of the intermediate image plane, or ZBE for short, in the microscope proportional to the glass path length of the introduced component. In many cases, their use in the convergent optical path leads to an increase in aberrations, which can also result in loss of microscope function. This circumstance requires constructive measures in the microscope to rectify the ZBE location in its position. Thus, it is possible to adjust the tube length or to generate a section of collimated light in the corresponding tube section by means of special dioptric modules (so-called Telan systems).

A microscope objective with a Finite Optics produces a real intermediate image. If filters or other elements are to be introduced into the beam path between the objective and the intermediate image when examining specimens, it is necessary to use intermediate tubes. This requires considerable effort.

In contrast, the beam path of a microscope with infinity optics is designed in such a way that the light rays belonging to an object point run parallel to each other after leaving the objective. In the space of collimated aperture rays, the introduction of plano-optical components does not cause a shift of the intermediate image plane. Their influence on the mostly narrowed course of the main rays in this space and thus on pupil imaging can be kept within limits by defining and maintaining the length of the collimation space, among other things. Filters or other elements can then be introduced into the path of parallel rays without the need for intermediate tubes. The infinity space ends at a tube lens system integrated in the microscope tube, whose task can be to generate a real intermediate image with additional chromatic, astigmatic, and also spherochromatic compensation.

In order to scan object planes located at different depths in the object space along the z-axis, which corresponds to the optical axis of the microscope, the microscope objective must be refocused. It is known to perform a corresponding refocusing automatically, i.e., to design the microscope objective to be autofocusable. In known microscopes, focusing is performed using an adjustment mechanism, with the aid of which optical components of a microscope are (re-) positioned along the optical axis in order to set the objective to a specific focal plane. In known automated image analysis procedures, however, it quickly becomes apparent that the "classical" refocusing process, for example using piezoelectric elements as actuators, is very slow and thus unsuitable for applications requiring rapid focusing. Therefore, there is a need in the industry to address one or more of the abovementioned shortcomings.

SUMMARY OF THE INVENTION

Embodiments of the present invention provide an autofocusable microscope objective. Briefly described, the present invention is directed to an autofocusable microscope objective, having an optical system including a plurality of optical components each formed by a lens or lens group, and an aperture stop. One of the plurality of optical components is a liquid lens to effect autofocusing of the microscope objective by using the liquid lens to adjust the microscope objective to a particular plane of focus in an automated manner. The liquid lens is arranged in direct vicinity of the aperture stop. The optical system includes a stationary system in which the position of the plurality of optical components in the optical system remains unchanged. The microscope objective is configured such that focusing in the range of at least +/−20 wave-optical depths of field is effected by a refractive power variation of the liquid lens in the range between −2.2 and +2.2 diopters.

A second aspect of the invention relates to a microscope including the microscope objective described above.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION

Reference will now be made in detail to embodiments of the present invention, examples of which are illustrated in the accompanying drawings. Wherever possible, the same reference numbers are used in the drawings and the description to refer to the same or like parts.

The exemplary embodiments of the present invention are directed to an autofocusable microscope objective with an optical system designed as finite or infinite optics and a compact design, in which autofocusing is made possible in a precise, image-faithful, and fast manner.

The embodiments relate to an autofocusable microscope objective with an optical system having a plurality of optical components each formed by a lens or lens group. Here, one of the plurality of optical components is a liquid lens to effect autofocusing of the microscope objective, and the optical system is formed as a stationary system.

According to the invention, the autofocusable microscope objective can have finite or infinite optics. In the former case, light rays coupled into the microscope objective result in a real intermediate image, whereas in the latter case, coupled light rays leave the optical system with parallel alignment.

For example, a liquid lens, also known as a (variable) fluid lens, VFL, has a chamber formed by two glass plates filled with two non-mixing transparent liquids/liquid media. Said glass plates may be formed as entrance and exit windows for coupling a light beam into and out of the liquid lens. In the extension direction of the optical axis of the liquid lens, both liquids or liquid media are arranged adjacent to each other, for example. Furthermore, the non-mixing transparent liquids have different refractive indices (also called "refractive indices") and electrical properties, e.g., different oils or oil and water. For similar, especially identical, densities of the liquids, the liquid lens is particularly robust to mechanical shock. By applying an electric field, which emanates from electrodes adjacent to the liquids and which penetrates said liquids, the liquid lens changes its shape (so-called electrowetting), in particular the radius of curvature of the liquids, which is formed from their common contact or boundary surfaces, and thus also their refractive power or focal length. For this purpose, the selected liquids are made of a polarizable material. These align themselves parallel to the direction of the electric field. In this way, the said radius of curvature can be freely selected and thus optical functions such as a focusing or a focal length variation can be implemented quickly and without mechanical movement of the liquid lens. The application of a specific electric field is done with the help of a controller/driver, which can be used to control the applied voltage to the electrodes. At a specific voltage, if the common interface of the liquids has an infinite radius of curvature, the liquid lens is refractionless/in a refractionless state; forming only a system of four plane-parallel layers/plates with different refractive indices and with media of different dispersion. For further different stress values, the interface of the fluid media has a finite radius, which can be concave or convex. The smaller the radius of curvature, the greater the positive or negative refractive power of the liquid lens and vice versa. In cases where there is no refractive state, the liquid lens is in a refractive state.

An optical system is designed to be stationary if a translation, specifically a mechanical movement, of the optical components is not required for the adjustment of certain focal planes. With the aid of liquid lenses, as explained above, refocusing is achieved by changing the shape of the lens; a displacement or translation of the entire liquid lens as an optical component is therefore not required. In contrast, known rigid lenses must be completely shifted within the optical system for the adjustment of different focal planes, i.e., translation must be performed on these lenses. In addition, mechanical refocusing by lens translation only is permitted in microscope systems of infinite tube length. Systems of finite tube length must be adjusted as a whole due to refocusing aberrations of the objectives used. In this case, the microscope objective according to the invention, which is designed for a finite tube length, offers particular advantages due to its stationarity.

The diameter of liquid lenses can be e.g., 3.5 to 4 mm, in particular between 3.6 and 3.9 mm. Larger diameters above 4 mm are equally possible; however, they may result in reduced imaging performance compared to lenses of smaller diameter due to perturbation effects, such as increased wavefront deformation or reduced stability with respect to the variable position of the lens in the gravitational field. The wave-optical depth of field describes the defocus path for an ideal optical or aberration-free system, in which the relative point image intensity (Strehl's definition brightness, or DEH), drops to 80% of its maximum value. Its value depends on the wavelength $\lambda$ and the (numerical) system aperture $A=n \cdot \sin(u)$, where n is the refractive index of the optical medium in the object space and u is the object-side aperture beam angle with the optical axis, and is defined by:

$$b_{0.80} = \pm \frac{n\lambda}{2A^2}. \qquad \text{(Eq. 1)}$$

For a typical numerical aperture of A=0.50 in the wavelength spectrum of visible light ($\lambda \approx 500$ nm), this results in a wave-optical depth of field of about +/−1 μm. As will be explained in more detail below, another characteristic quantity of a liquid lens is the equivalent Abbe number $v_{äq}$. $v_{äq}$ is a dimensionless quantity. Preferably, the equivalent Abbe number $v_{äq}$ of the liquid lens is between 14 and 25, especially preferably between 14 and 20.

While known lenses with adjustment mechanics require several seconds depending on the travel distance and technical implementation and achieve a positioning accuracy of 0.2 to 2 μm, the microscope lens according to the invention can change the focal plane after only a few milliseconds and due to finely tuned changes in the lens shape with a higher degree of focus than classical systems. Furthermore, the use of a stationary system with a liquid lens has the advantage that the optical system allows a more compact design than systems that detect different focus planes by mechanically positioning optical components. The refractive power of a liquid lens can vary between −15 and +35 diopters, preferably between −5 and +15 diopters, more preferably between −2.2 and +2.2 diopters. According to the invention, it may already be sufficient if the refractive power of the liquid lens varies between −2.2 and +2.2 diopters in order to achieve focusing in a wide certain range, such as in a range of +/−25 wave-optical depths of field. However, larger refractive power variations—such as those mentioned above—are also conceivable. As long as the values of the refractive power can be considered small, the required refractive power range scales linearly with the particular focusing range. Thus, with a varying refractive power of the liquid lens from −4.4 to +4.4 diopters, focusing can be acquired over a range of +/−50 wave-optical depths of field. Basically, when focusing, it should be considered that already a shift of the object plane by an interval $b=2 \cdot b0._{80}$, i.e., twice the wave-optical depth of field, causes the substantial loss of imaging power in an ideal system, where the Strehl definition brightness reaches a value of only DEH~35%. In the domain of contrast transmission, this means a shift from an ideal system with A=0.50 and $\lambda$=500 nm of the still resolvable high spatial frequencies (e.g., for the criterion of modulation from a modulation transfer function, MTF, =10%) from R10%=1608 Lp/mm (line pairs per millimeter) to low R10%=738 Lp/mm. This loss of focus is very evident in the observational practice of diffraction-limited systems.

Focusing or (exact) focusing in a diffraction-limited system has been achieved when the value DEH>80% has been reached for the main color (e.g., the green line "e" in the spectral VIS range).

Particularly preferably, the microscope objective according to the invention is designed in such a way that focusing in the range of at least +/−20 wave-optical depths of field, particularly preferably in the range of at least +/−25 wave-optical depths of field, is effected by a variation of the refractive power of the liquid lens in the range between −2.2 and +2.2 diopters. As will be shown in detail later, this allows the small variation of the refractive power to minimize the so-called chromaticity aberration.

Further optical components, which are designed as individual lenses or as a combination of several lenses to form a lens group, can contribute to color correction or to image field flattening of the imaged image. This includes, but is not limited to, optical components that form at least parts of an achromat, fluorite lens, apochromat, or plano lens, i.e., a planachromat or planapochromat. Lens groups may be created from several interconnected single lenses. The interconnection of individual lenses is accomplished at respective aligned surfaces of two lenses that have an identical or similar radius of curvature, e.g., by cementing or gating the lens surfaces and then joining these surfaces together. Typically, lenses for use in the visible (VIS −) spectral range are made of optical glasses, anisotropic crystals (e.g. $CaF_2$, $LiF$, $BaF_2$, $KAl(SO_4)_2 \cdot 12H_2O$, $SrTiO_3$), fused quartz, or even plastics such as polycarbonates, polymethyl methacrylates, or cyclo-olefin(Co) polymers.

Autofocusability of the microscope objective refers to the automated adjustment of at least one component of the optical system to set the objective to a specific focal plane. This includes changing from one plane of focus to another. In the present case, the liquid lens in particular is responsible for setting the plane of focus in order to fully exploit the advantages of fast and precise focusing. Crucially, in this case the liquid lens is part of a stationary system. The position of the lenses in the optical system thus remains unchanged; in particular, the position of the liquid lens does not change. Rather, variations in the refractive power occur essentially through the generated change in shape of the lens under the influence of an electric field.

Preferably, the microscope objective includes an aperture stop, or APE, as another component of the optical system, with the liquid lens located in close proximity to the aperture stop.

For the purposes of the invention, "direct proximity" is understood to mean that the liquid lens is so close to the aperture stop that there is no significant functional difference whether or not the two components are in contact. In addition, "direct proximity" also imposes certain spatial limits, that is, specifically, the two components under consideration must be directly adjacent or directly contiguous.

An aperture stop is any (optical) component which is designed to determine the light rays or light beams coupled into the optical system along the cross-sectional area spanned around the optical axis. Among other things, aperture stops influence image brightness and depth of field.

Due to the close proximity of the liquid lens to the aperture stop, aberrations such as chromatic or spherical aberration, astigmatism and/or field curvature and distortion are sufficiently corrected to provide an image that is both sharp and substantially free of distortion, despite variations in the refractive power of the liquid lens. In other words, by locating the liquid lens in close proximity to the aperture stop, imaging performance is substantially maintained despite variability in refractive power.

Particularly preferably, the liquid lens is located in a region of the optical system where the light beams that can be coupled into the optical system are most constricted. More generally, it may also be required that the liquid lens be located in a region of tightest constriction of the envelopes of all beams in the system (also referred to as pharoid beams). By placing the liquid lens at the location of the most severe constriction of the beam bundle, the required correction state of the microscope objective is maintained to a large extent even during refocusing, and a consistently high imaging quality of the objective can be achieved despite varying refractive power of the liquid lens.

Advantageously, at least one of the plurality of optical components of the optical system is formed as a lens or lens group such that an image formed by the microscope objective obtains image field flattening and anastigmatic correction.

Preferably, one of the plurality of optical components of the optical system is formed as a first meniscus. It is convenient if the lens or lens group formed such that an image formed by the microscope objective obtains image field flattening and anastigmatic correction is formed as a first meniscus.

Furthermore, it is advantageous if the liquid lens is arranged downstream of the meniscus and all other optical components with respect to the propagation direction of a light beam that can be coupled into the optical system. Particularly preferably, the liquid lens is arranged in the optical system in such a way that it assumes a position in this system that is natural as an aperture stop.

In the optical system of the microscope objective, the natural position of an aperture stop means the position characterized by providing a telecentric light propagation perspective, i.e., a perspective with collimated main rays or collimated heavy rays in case of geometric vignetting, in the object space of the system. A telecentric light propagation perspective is used to capture objects without perspective distortion. Furthermore, the image scale remains unchanged with axial object displacement, so that the image always remains the same size regardless of the object distance. The telecentric light propagation perspective can be realized by means of (optical) components, in particular the liquid lens, in the image-side focal plane.

It is further convenient if one of the plurality of optical components of the optical system is formed as a second meniscus and the liquid lens is disposed between the first and second menisci. This can further improve the image field flattening and anastigmatic correction of the optical system.

Particularly preferably, the first and second menisci are aligned such that, in a refractive state of the liquid lens, the aperture and main rays of a light beam that can be coupled into the optical system are guided such that the aperture ray angle and the main ray angle at the light exit surface of the first meniscus are equal or approximately equal to the aperture ray angle and the main ray angle at the light entrance surface of the second meniscus. Thus, this is to be sought in a range of non-vanishing refractive power of the liquid lens required to achieve focusing within a certain predetermined range, such as at least +/−25 wave-optical depths of field.

For the definition of the optical terms aperture beam and principal ray, it must first be assumed that each object point in the object plane sends the light into its front half-space in the sense of a self-illuminator, which means that the role of beam limitation is completely assigned to the optical system of the microscope objective. If the object point is on the system axis, the aperture stop in the system limits the width of the light cone still accepted by the system. The measure of this width is given by the maximum angle of the envelope line, or in meridional section by the angle u[°] of the aperture ray with the optical axis. The aperture beam runs along the edge of the aperture stop. For an object point lying beyond the system axis, the beam is also limited in the system. For the homocentric light cone, its symmetry axis is found and traced in the system until it intersects with the optical axis. The place where the axes intersect—this is true for all object points—is the center of the aperture stop. The rays passing through the center of the aperture stop are the principal rays. In meridional section, the angle w[°] describes the angle of the principal ray with the optical axis of the system.

By the requirements for the menisci given in the penultimate paragraph, it is required that the refractive power changes of the liquid lens should be of a kind to realize a minimum of ray deflection but also a symmetrical ray deflection around the refractive powerless state. This means that even in the position of maximum positive or negative refractive power of the liquid lens, which is required for focusing in the certain predetermined range, the course of the aperture rays should change little, but in particular the course of the main rays should hardly change its trajectory. The better the values of the aperture ray and main ray angles at the first and second menisci match in both the no-refractive-force state and the refractive state of the liquid lens, the lower the aberration effects of the microscope objective over the entire focusing range of the liquid lens.

As stated above, the liquid lens is refractionless/in a refractionless state when, at a specific stress, the common interface of the liquids has an infinite radius of curvature. In other words, by the refractionless state of the liquid lens is meant a reference state for which the known geometrical properties of the ray angles in front of and behind the complex of the liquid lens, for example, of four plane-parallel plates, also prevail. In contrast, the liquid lens is in a refractive state when there is no refractionless state, i.e., the specific stress is chosen so that the common interface of the liquids has a finite radius of curvature.

Particularly preferably, the concave surfaces of the first and second meniscus face each other. This makes it possible to achieve an image that is defined with respect to the chromatic difference in magnification, or CVD for short, and is largely free of asymmetry error. It is advantageous if at least the first and/or second meniscus is formed by a single lens. However, in order to increase the freedom in the design of the optical system, an advantageous further development provides that the first and/or second meniscus is formed as a cement member of at least two cemented lenses.

The optical system is designed in such a way that the diameter of the exit pupil corresponds to 0.8 to 1.3 times the diameter of the clear optical passage of the liquid lens. Here, the images of the aperture stop given by the system or its parts in the object and image space are referred to as entrance and exit pupil, EP and AP for short. If the liquid lens is the last component in the system in the direction of propagation of the coupled light and assumes the function of the aperture stop, the clear diameter of the liquid lens determines the diameter of the exit pupil of the objective DAP. If, on the other hand, the liquid lens is installed and corrected within a system, the position and size of the objective exit pupil is determined by the imaging process from the aperture stop to its image and thus to its exit pupil by the dioptric part of the optical system, which is located between the aperture stop and the image space. A primary quantity of this above-mentioned imaging process is the imaging scale with which the free diameter of the liquid lens DAPE is transformed to the diameter DAP of the system exit pupil.

It is further advantageous if the optical system has a front group that is arranged closest to the object/preparation plane within the optical system. The front group may include one or more optical components. Within the synthesis of the microscope objective optical system, the function of the front group is primarily to substantially reduce the large aperture angle of the light beam of the object space downstream to the optical components downstream of the front group.

Particularly preferably, an optical component of the optical system is such that an image generated by the microscope objective receives a spherochromatic correction. It is also advantageous if at least one optical component is arranged downstream of the front group in the propagation direction of a light beam that can be coupled into the optical system (in short: light direction), which is designed for a spherochromatic correction of the optical system. For example, a lens group can be arranged downstream of the front group in the light direction, including a combination of two cemented or free-standing lenses, e.g., a bi-convex and a concave-convex lens.

Furthermore, it is useful if the microscope objective is designed as a planachromat or planapochromat.

In the spectral VIS range, planachromats realize a planastigmatic imaging of a defined field size in the spectrum F'C' or FC as indicated by the so-called spectral Marechal width. The Marechal width designates the spectral continuous bandwidth defined by the shortest and the longest wavelength for which a lens focused to the maximum DEH value at the main color for the axis point still shows diffraction-limited performance (DEH=80%). The parameters of this evaluation are the wavelength and the field coordinate.

Due to the higher cost of the functional elements in the system, a planapochromat spectrally extends this correction and realizes a spectral Maréchal width from the line g=435.8343 nm into the line C'=643.8469 nm or C=656.2725 nm.

In addition, much attention is paid to the correction of Gaussian error (spherochromacy), especially for planapochromats of medium and high numerical aperture.

Figure 1:
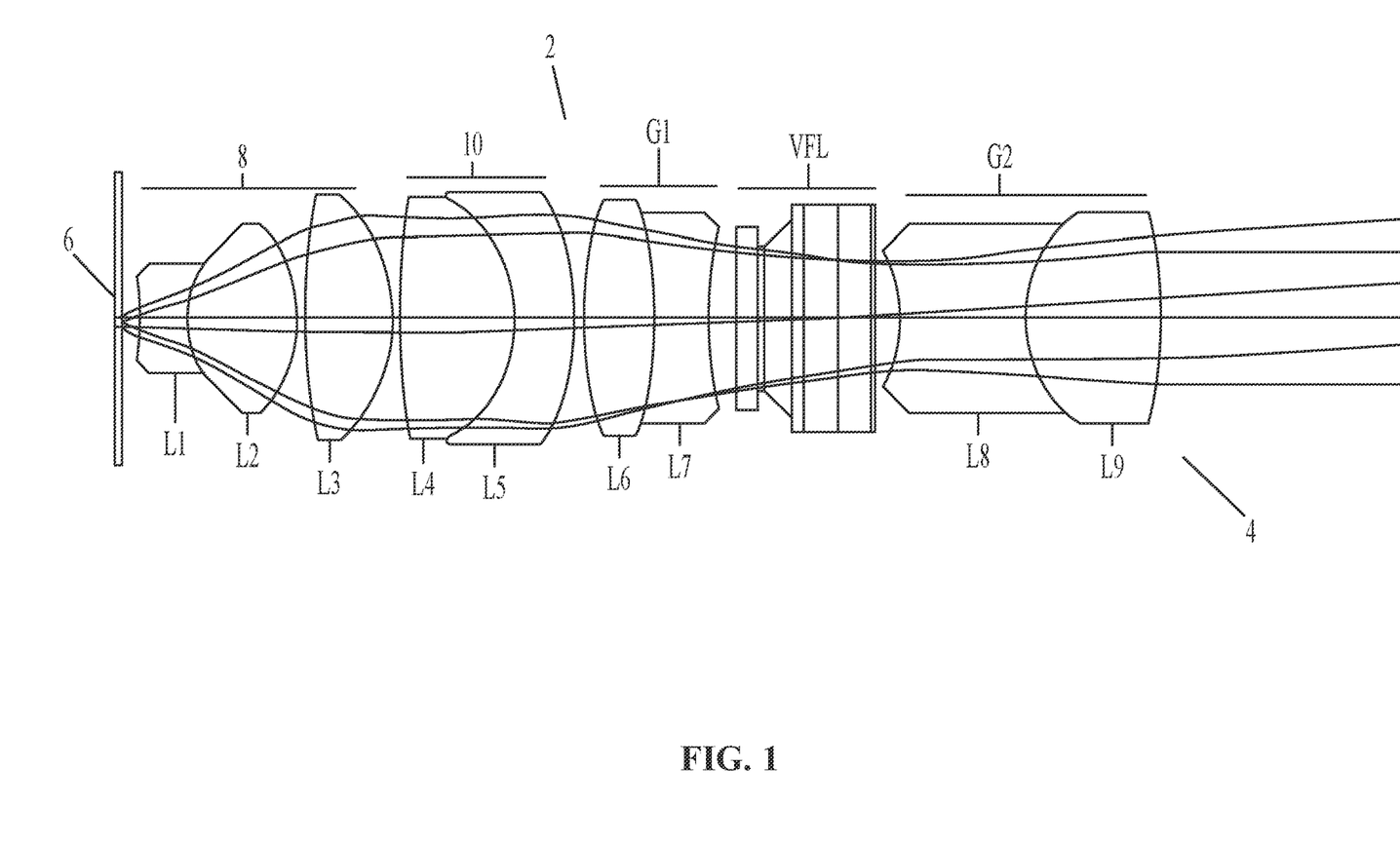
FIG. 1 is schematic diagram showing a cross-section of an embodiment of the microscope objective according to the invention.

FIG. 1 shows a cross-sectional view of an embodiment of the autofocusable microscope objective 2 according to the invention, which has an optical system 4 formed as infinity optics. The optical system further includes a plurality of optical components each formed by a lens or lens group.

According to the embodiment, the optical system 4 has a liquid lens L10 for autofocusing. The liquid lens L10 is arranged between a first lens group G1 and a second lens group G2. A specimen plane of the microscope is indicated by reference mark 6 in FIG. 1. The propagation direction of the light emanating from the preparation plane (in short: light direction) runs from left to right in FIG. 1. Accordingly, the lens group G1 is arranged in front of the liquid lens L10 in the light direction and the lens group G2 is arranged behind the liquid lens L10 in the light direction.

The microscope objective 2, hereinafter also referred to as objective 2 for short, has a front group 8 composed of three lenses L1, L2 and L3. The front group 8 is arranged closest to the specimen plane 6 with respect to the other optical components of the optical system 4, and essentially serves to widen the aperture angle of the light beam entering from the specimen plane 6 by means of the bi-concave lenses L1 and the bi-convex lens L2, and to further focus it by means of the plano-convex or bi-convex lens 3. Lenses L1 and L2 are cemented together, while lens L3 is a single lens. However, the lenses L1 and L2 can also be unconnected.

A lens group 10 is arranged downstream of the front group 8 in the direction of light. Lens group 10 includes two cemented lenses L4, L5 and is primarily used for spherochromatic correction of lens 2.

Furthermore, lens groups G1 and G2 are arranged downstream of lens group 10 in the direction of light.

In the microscope objective 2 shown in FIG. 1, the front group 8, the lens groups 10, G1 and G2, and the liquid lens L10 together form a stationary optical system 2. That is, none of the components mentioned need to be mechanically moved/translated for focusing.

In the embodiment shown, lens groups G1 and G2 are each formed as a meniscus, with lens group G1 including cemented-together lenses L6 and L7 and lens group G2 including cemented-together lenses L8 and L9. It is advantageous if the concave surfaces of the menisci—as shown in FIG. 1—forming the lens groups G1 and G2 face each other. G1 and G2 thus serve primarily for image field flattening and astigmatic correction of the lens 2.

A liquid lens L10 is positioned between the lens groups G1 and G2. Along a light beam coupled into the optical system 4, the liquid lens L10 is positioned, in particular, at the location of the narrowest constriction of the envelopes of all rays in the system (also referred to as pharoid rays). At the location of the tightest constriction is a natural aperture stop, APE, (not shown) of the objective 2. The natural aperture stop identifies that location in the optical system 4 where the natural location of the aperture stop is in the optical system of a microscope objective. Specifically, this means that the aperture stop occupies a position that ensures a telecentric light propagation perspective in the object/preparation space of the objective, i.e., the collimation of the main rays or the heavy rays in the case of geometric vignetting in the system. In the present case, the aperture stop may be located upstream or downstream of the liquid lens in the light direction. It is also possible that the aperture stop is formed by the liquid lens itself or by one or more components of the liquid lens.

As an alternative to the embodiment example according to FIG. 1, a single meniscus arranged in front of the liquid lens L10 in the light direction can also be provided, in which case the liquid lens L10 is the last optical component of the optical system 4 in the light direction and forms the location of the natural aperture stop APE of the optical system 4.

The autofocusing of the objective 2 is performed by changing the refractive power of the liquid lens L10. This can be controlled accordingly.

For example, the liquid lens L10 includes a chamber formed by two glass plates filled with two non-mixing transparent liquids/liquid media. Further, these liquids/liquid media in direct contact have different refractive indices and electrical properties. For example, the first liquid may be an oil and the second liquid may be another oil or water. For similar, especially identical densities of the liquids, the liquid lens is particularly robust to mechanical shocks. When an electric field is applied to the electrodes adjacent to the liquids and passes through said liquids, the liquids change the radius of curvature formed by their common contact or boundary surfaces and thus also their refractive power or focal length (electrowetting). In this way, optical functions such as (re-)focusing or focal length adjustment can be implemented quickly and without mechanical movement of the liquid lens. A specific electric field is applied with the aid of a controller/driver, which can be used to control the voltage applied to the electrodes.

The liquid lens L10 can be, for example, a liquid lens as marketed by the French Varioptic S.A. under the designation "Arctic 39N0". Such a liquid lens has a clear optical passage with a diameter of 3.9 mm. The clear optical passage of the liquid lens is understood to be the effective optical surface of the liquid lens in terms of light refraction. In addition, a change in refractive power from −5 diopters to +15 diopters can be implemented. A microscope objective equipped with such a liquid lens can thus be refocused over a range of at least $ds=+/-25 \cdot b0_{.80}$ ($b0_{.80}$ is the wave-optical depth of field defined earlier), in particular with a refractive power variation of +/−2.2 diopters. By wave-optical depth of field it is meant the defocus path for an aberration-free ideal system that causes the brightness to drop to 80%. The Arctic 39N0 is capable of providing imaging performance appropriate to the imaging purpose of a microscope objective. The microscope objective with the Arctic 39N0 liquid lens produces 45× magnification at a numerical aperture of A=0.50.

The fact that, in the sense of the invention, the liquid lens is arranged in the direct vicinity of the aperture stop, in particular at the location of the strongest constriction of the beam bundles, means that the required correction state of the microscope objective is maintained to a large extent even during refocusing. In other words, this means that the imaging quality of the objective is always high despite varying refractive power of the liquid lens. After all, the use of the liquid lens under the above conditions makes it possible for the first time to provide a microscope objective that can be refocused in a simple, fast, and precise manner.

Figure 2:
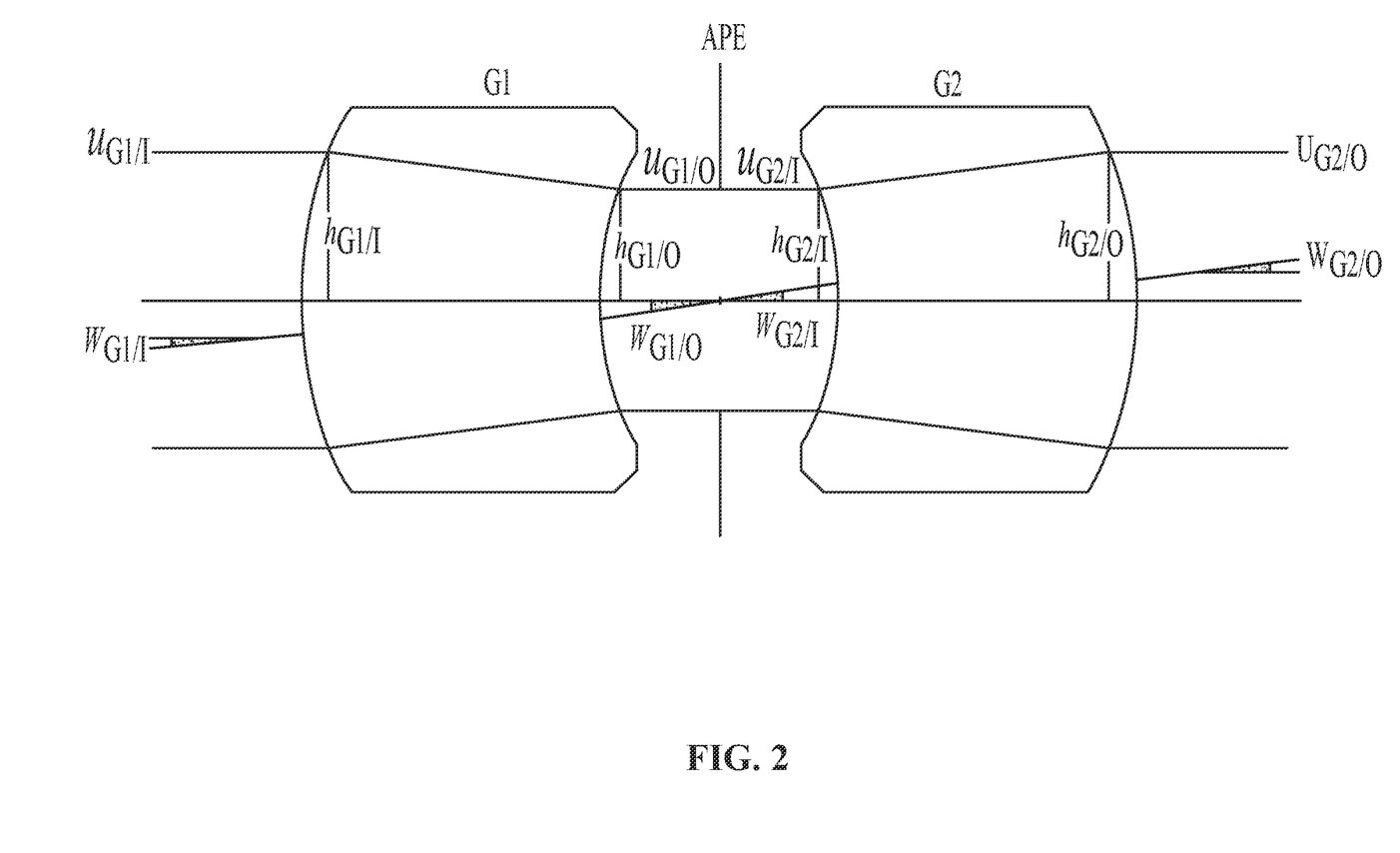
FIG. 2 is a schematic of a part of the optical system of the microscope objective according to FIG. 1 in the area of the aperture stop.

FIG. 2 schematically shows a part of the optical system of the microscope objective according to FIG. 1 in the area of the aperture stop 11. The reference signs used in FIG. 2 correspond as far as possible to those of FIG. 1. In the present case, lens group G1 is arranged directly or in the immediate vicinity in front of aperture stop 11 and liquid lens (not shown) in the direction of light; lens group G2, on the other hand, is located directly or in the immediate vicinity behind aperture stop 11 and liquid lens (not shown) in the direction of light. Lens groups G1 and G2 may include one or more lenses. The lenses forming G1 and G2 may be cemented and/or free-standing.

For a better overview, the light direction is indicated by an arrow. In addition, the abbreviations used in FIG. 2 have the following meaning:

ux: Aperture beam angle at location x;
wy: Main beam angle at location y;
hz: Aperture beam height at location z;
G1/I: Location determination, here input of lens group G1;
G1/O: Location determination, here output of lens group G1;
G2/I: Location determination, here input of lens group G2;
G2/O: Location determination, here output of lens group G2.

In the following, the preferred location of the liquid lens in the optical system of the microscope objective according to the invention is briefly described. Reference is made here to the problem that liquid lenses are typically hyperchromatic lenses. A hyperchromatic lens is characterized by having increased chromatic aberration. The chromaticity of a lens is determined by its refractive power and the dispersion of its medium (or Abbe number vd). The greater the dispersion of the medium (or the smaller its Abbe number), the greater the chromasia. Because of these properties, hyperchromatic liquid lenses introduce a variable and sometimes large aberration contribution, especially chromaticity aberration and color magnification aberration, into the system. Thus, for a high imaging performance, an appropriate total system correction (i.e., a correction against occurring aberrations after optical transformation) is required. Therefore, the following considerations, among others, shall be used at this point to assess and minimize the influence of the variable refractive power of the liquid lens on the chromaticity aberration of the system and to establish the condition for the disappearance of the variation of the chromaticity aberration.

The following applies to the $_{aperture}$ beam height in front of and behind the lens group G1: hG1/I>hG1/O.

The following applies to the $_{aperture}$ beam height in front of and behind the lens group G2: hG2/I<hG2/O.

In the aperture stop space between G1 and G2, three following situations are possible:

1. hG2/I<hG1/O, i.e., an aperture beam convergent in the light direction with uG1/O<0;
2. hG2/I=hG1/O, i.e., an aperture beam collimated in the light direction with uG1/O=0;
3. hG2/I>hG1/O, i.e., an aperture beam divergent in the light direction with uG1/O>0.

In the space in front of the lens group G1, the aperture rays are allowed in the direction of light:
  be collimated with uG1/I=0;
  be convergent with uG1/I<0;
  be divergent with uG1/I>0.

In the space behind lens group G2, the aperture rays are allowed in the direction of light:
  be collimated with uG2/O=0;
  be convergent with uG2/O<0;
  be divergent with uG2/O>0.

If the aperture stop 11 is located behind the lens group G1 in the image space of the lens, the lens group G2 is not present and the corresponding above-mentioned conditions for G1 and aperture stop 11 apply.

Integrated computationally into the optical system of the microscope objective, the geometrical-optical structure of the liquid lens is no longer a thin component compared to the corresponding dimensions of the G1 and G2 lens groups. This should be noted in particular for the Arctic 39N0, since the vertex length ("thickness") of the liquid lens, i.e., the distance between the first and the last vertex, is approximately 3.65 mm, which corresponds to the free diameter of this lens. The following conditions for the course of the aperture rays and the main rays are to be aimed at in a range of non-vanishing refractive power of the liquid lens, which is necessary to achieve focusing in a certain predetermined range, such as at least +/−25 wave-optical depths of field:

1. uG1/O equal or approximately equal to uG2/I for the aperture rays in the space of aperture stop 11;
2. wG1/O equal or approximately equal to wG2/I for the main rays in the space of the aperture stop 11.

Meeting these conditions guarantees good aberration characteristics of the lens in the entire range of focus.

The liquid lens is further a complex optical component that can consist of four elements and three optical media. The Arctic 39N0 liquid lens features a chamber formed by two thin glass plates. Here, the glass plates assume the function of the entrance and exit windows. Along the optical axis of the lens or the normal of said windows, two oils are arranged side by side as optical liquids with different refractive index nd and dispersion (or Abbe number) vd. The first oil is designated PC413B, including $n_d$=1.38417 and vd=60.45, whereas the second oil is designated H527, including $n_d$=1.50635, vd=39.95. The entrance and exit windows are made of D263T engineering glass, including $n_d$=1.52309, vd=55.42.

In order to be able to assess the chromatic influence of the liquid lens in an optical system, it is necessary to determine a parameter defining the aggregate effect of all the above-mentioned optical components, which allows to objectively assess the influence of the liquid lens on the aberrations of the entire optical system in known analytical formulas of a system pre-calculation. An adequate parameter is the "equivalent Abbe number" väq.

When defining the equivalent Abbe number, the following should be noted: An equivalent Abbe number can be determined for any optical system which is composed of many optical components, each of which (lens) consists of a defined medium which has its own Abbe number.

For this purpose, the wavelength triple of the following Fraunhofer lines is considered as an example: F'=479.9914 nm; e=546.0740 nm; C'=643.8469 nm. For each of these Fraunhofer lines, the system focal length, i.e., f'(F'), f'(e), f'(C'), can be calculated (f' denotes the image-side focal length). Furthermore, for the spectral interval boundary lines, the focal length difference can be calculated as follows:

$$df'=f(F')-f(C').\qquad\text{(Eq. 2)}$$

The relative focal length difference is equal to the negative reciprocal of the equivalent Abbe number $v_{äq}$ of an optical system or optical assembly in the system:

$$df'/f'(e)=-1/v_{äq}.\qquad\text{(Eq. 3)}$$

Further applies:

1. The equivalent Abbe number $v_{äq}$ indicates what value the regular Abbe number v(e) of a single lens of focal length f'(e) would have to have in order to have a chromatic property equal to that of the above optical system or group.
2. The regular Abbe number of an optical medium is:

$$v(e)=\frac{n(e)-1}{n(F')-n(C')}.\qquad\text{(Eq. 4)}$$

This expression describes the "dispersion force" of an optical medium with refractive index n. The difference n(F')−n(C') is the main dispersion of the optical medium.

3. In chromatically corrected systems, one speaks of the main wavelength (main color) and of an achromatic wavelength pair. In system achromatization in the VIS range applies:
  the Fraunhofer line e as the main color;
  the Fraunhofer lines F' and C' as the achromatic wavelength pair.

4. For the liquid lens Arctic 39N0 the following limits for radius R and focal length f'(e) are possible (the green Fraunhofer line "e" has the wavelength of 546.0740 nm):
  R~+3.59712 mm and f'(e)=+29.07988 mm (or +34.4 dpt.); f'(F')=28.42240 mm; f'(C')=29.914534 mm;
  R~−7.8100 mm and f'(e)=−63.13766 mm (or −15.8 dpt.); f'(F')=−61.71014 mm; f'(C')=−64.94984 mm.

The equivalent Abbe number of Arctic 39N0 is thus $v_{äq}$=19.49; its value is the same at any lens position or for any lens focal length. For other liquid lenses, however, the equivalent Abbe number need not be constant. Thus, the Arctic 39N0 belongs to the range of hyperchromatic components. Another hyperchromatic liquid lens is the "Arctic A316"; its equivalent Abbe number is $v_{äq}=14.34$. In principle, however, liquid lenses with an equivalent Abbe number $v_{äq}$ of 14 to 25 are conceivable.

Analytical observation (start stages of synthesis) and later calculation and evaluation of microscope lenses can be regular in the light direction but also against it. In the latter case, the last lens of the regular light path is the first in the analysis.

With the help of the definition of the equivalent Abbe number, it is now possible to mathematically characterize and evaluate the influence of the variable refractive power of the liquid lens on the chromaticity aberration of the system and to establish a condition for the disappearance of the variation of the chromaticity aberration.

The chromaticity aberration is proportional to the longitudinal chromaticity difference of $\Delta s'_p$ and the image location. To determine a condition for the achromaticity of the image location in a system composed of p elements—permissible system reduction to equivalent lenses, i.e., lenses of vanishing thickness—the following relationship is considered:

$$-\left(\frac{h_p}{h_1}\right)^2 \cdot \frac{\Delta s'_p}{s'_p} = \sum_{i=1}^{p}\left(\frac{h_i}{h_1}\right)^2 \cdot \frac{\Phi_i}{v_i}, \quad \text{(Eq. 5)}$$

Thereby are:
$h_i$ the aperture beam height on the lens i;
$s'_p$ the image-side system section width;
$\Delta s'_p$ the longitudinal color difference of the image location (e.g., $\Delta s'_p = s'_F - s'_{C'}$);
$\Phi_i$ is the refractive power of the lens i;
$v_i$ is the Abbe number of the lens i $$\left(\text{e.g., } v_i(e) = \frac{n_i(e)-1}{n_i(F')-n_i(C')}\right)$$

or the equivalent Abbe number.

The condition for the system achromaticity for two wavelengths (e.g., F' and C') is $\Delta s'_p=0$; in this case the chromaticity coordinates error $\Delta s'_p$ disappears, thus the chromaticity coordinates error can also be minimized. It can be seen that this correction state is only influenced by the material parameters of the lens material and the refractive power distribution of the lenses in the system.

From equation (5) and assuming that one of the lenses is the liquid lens (e.g., lens k), results:

$$-\left(\frac{h_p}{h_1}\right)^2 \cdot \frac{\Delta s'_p}{s'^2_p} = \quad \text{(Eq. 6)}$$

$$\frac{\Phi_1}{v_1} + \left(\frac{h_2}{h_1}\right)^2 \cdot \frac{\Phi_2}{v_2} + \ldots + \left(\frac{h_k}{h_1}\right)^2 \cdot \frac{\Phi_k}{v_k} + \ldots + \left(\frac{h_p}{h_1}\right)^2 \cdot \frac{\Phi_p}{v_p}$$

If the refractive power of the lens k is variable, as in this case, the expression on the right side of equation (6) is no longer constant. The prerequisite for the compensation of the chromaticity aberration in the optical system by adjusting the refractive powers $\Phi_i$ and the Abbe numbers $v_i$ or the equivalent Abbe number $v_k$ in the real lens is given only for a refractive power $\Phi_k$ of the focusing lens.

For all other values of $\Phi_k$, the liquid lens introduces a chromaticity aberration into the image. Therefore, it makes sense to keep the variation of the refractive power $d\Phi_k$ of the hyperchromatic liquid lens sufficiently small and still provide the desired target for a sufficiently large stroke of the effective refocusing +/−dz in the object plane. Under certain conditions, a refractive power variation of −2.2 to +2.2 diopters is sufficient to achieve refocusing over a range of +/−25 wave-optical depths of field. Such a constellation can be realized, for example, with the microscope objective according to the embodiment when using the liquid lens Arctic 39N0.

It would be advantageous if the equivalent Abbe number $v_k$ of the liquid lens is as large as possible to suppress the corresponding contribution on the right-hand side of equation (6). Liquid lenses with an equivalent Abbe number in a range between 60 and 95, (an equivalent Abbe number of 95 is achievable, e.g., for CaF2, an equivalent Abbe number of at least 64, is achievable, e.g., for a typical boron-crown glass (e.g., BK7)), would just lead to a suppressed contribution of equation (6).

The variable color magnification error in the optical system is another consequence of the refractive power variation of the hyperchromatic liquid lens. It can be characterized by the following formula:

$$\frac{\Delta y'}{y'} = \frac{s_1 \cdot s_{Pr1}}{s_1 - s_{Pr1}} \sum_{i=1}^{p} \frac{h_i}{h_1} \frac{h_{Pr,i}}{h_{Pr,1}} \frac{\Phi_i}{v_i} \quad \text{(Eq. 7)}$$

Meaning here:
$\Delta y'$ the lateral color difference of the image size $y'_{\lambda 1} - y'_{\lambda 2}$, which can be generalized to a principal ray coordinates difference for two wavelengths $\lambda 1$, $\lambda 2$ in a defined image plane in the presence of the chromaticity coordinates error;
$y'$ Reference image height in main color, defined by e.g., $\lambda = \sqrt{\lambda 1 \cdot \lambda 2}$;
$s_1$ Object section width, referred to the first lens;
$s_{Pr1}$ Entrance pupil intercept, referred to the first lens;
$h_{Pr,i}$ Main beam height on the lens i.

Otherwise, the nomenclature of equation (5) applies. From equation (7) and assuming that one of the lenses is the liquid lens (here: lens k) results:

$$\frac{\Delta y'}{y'} = \frac{s_1 \cdot s_{Pr1}}{s_1 - s_{Pr1}} \quad \text{(Eq. 8)}$$

$$\left(\frac{\Phi_1}{v_1} + \frac{h_2}{h_1}\frac{h_{Pr,2}}{h_{Pr,1}}\frac{\Phi_2}{v_2} + \ldots + \frac{h_k}{h_1}\frac{h_{Pr,k}}{h_{Pr,1}}\frac{\Phi_k}{v_k} + \ldots + \frac{h_p}{h_1}\frac{h_{Pr,p}}{h_{Pr,1}}\frac{\Phi_p}{v_p}\right)$$

For chromatically unperturbed autofocusing—i.e., for $\Delta y'/y'=$const, a constant value of the bracket expression from equation (8) is crucial. However, if the refractive power of the liquid lens $\Phi_k$ changes its value, there will inevitably be a color magnification error in the image proportional to this change in refractive power $d\Phi_k$. The only way to make the lateral color difference $\Delta y'$ independent of the variation $d\Phi_k$ is to aim for $h_{Pr,k}=0$.

This is equivalent to a central passage of the main beam through the liquid lens, which is ensured by the direct proximity of the aperture stop to the liquid lens. The preferred position also has the advantage that, in addition to correcting chromatic aberrations, anastigmatic or compensatory (periplanatic or complanatic) image field flattening can be achieved, among other things.

The quotient $\Delta y'/y'$ is also referred to as chromatic magnification difference, CVD, and forms a fundamental variable of a microscope system. A distinction is made between systems with CVD=0 (compensation-free systems in the domain of the color magnification error) and those with typical CVD compensation values of 0.8% to 2%.

In a microscope system of infinite tube length, the tube lens system corrected accordingly in the selected compensation system or/and the eyepiece or projective is responsible for the optical process of chromatic compensation.

Integrated computationally into the optical system of the microscope objective according to the embodiment, the geometrical-optical structure of the liquid lens is no longer a thin component compared to the corresponding dimensions of the lens groups G1 and G2. Likewise, the location of the narrowest free diameter within the liquid lens does not coincide with the location of the sphericity-variable functional interface, whose vertex location along the optical axis additionally varies with its radius of curvature. The narrowest free diameter tends to be shifted near the entrance or exit window of the liquid lens. The optical system can be calculated mathematically, and it turns out that decisive in the calculation of the system is the analytical consideration of the first and third order aberrations (according to the so-called Seidel theory). Finally, with the help of the calculation of the system, a strict geometrical-optical correction of the overall system can be performed with respect to different configurations of the focusing; furthermore, this also allows a classification of the microscope objective on the basis of the imaging quality achieved (e.g., by determining the Maréchal width).

Figure 3:
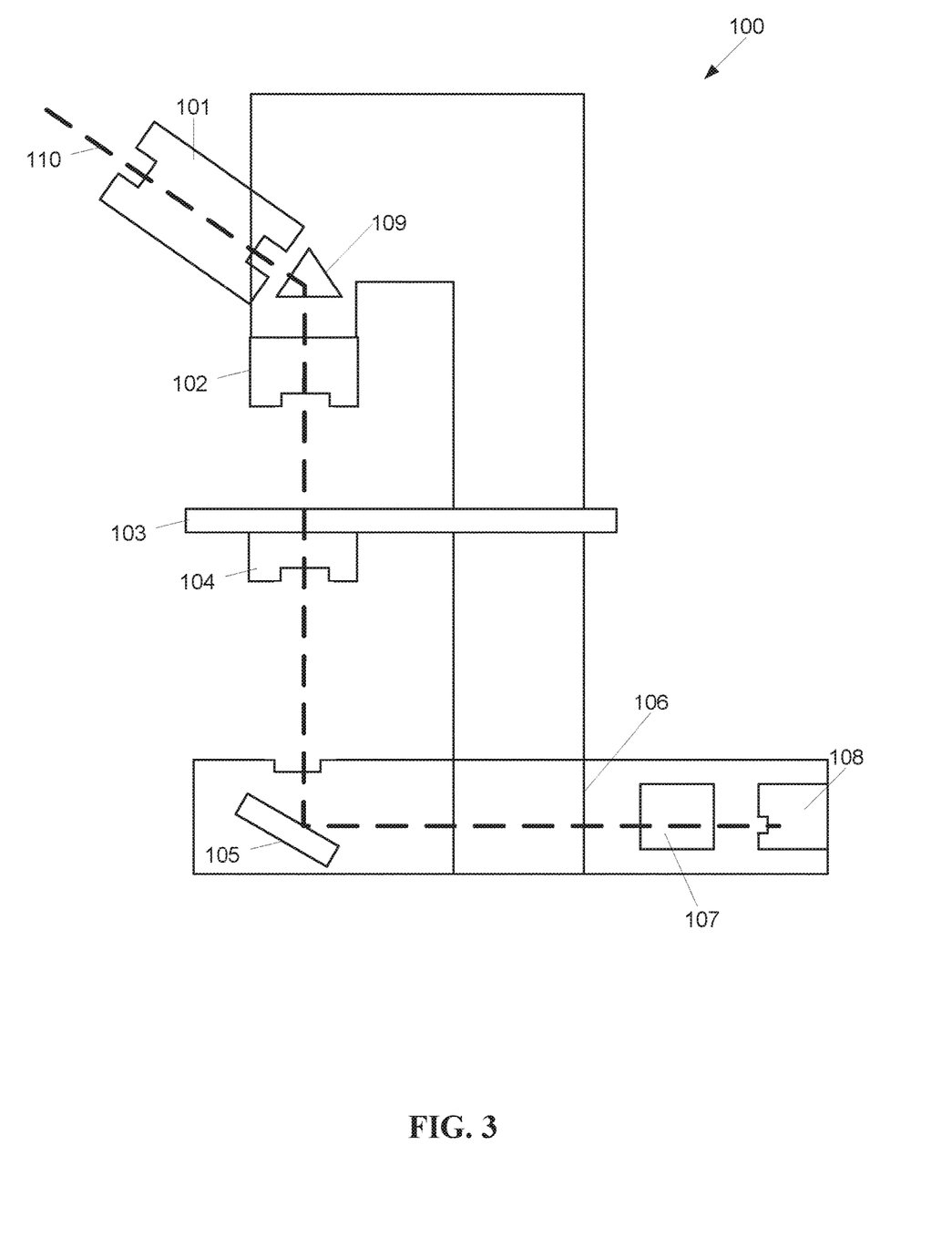
FIG. 3 is a schematic side view of a microscope including the microscope objective according to the invention.

FIG. 3 shows a schematic side view of a microscope including the microscope objective according to the embodiment. In the embodiment shown, the microscope 100 has an eyepiece 101, the microscope objective 102 according to the embodiment, a specimen stage 103, a condenser 104, a deflection mirror 105, a light field stop 106, a collector 107, a light source 108 and a prism 109. The surface of the specimen stage 103 facing the microscope objective 102 forms the specimen plane. Furthermore, a light beam 110 coupled into the microscope is shown.

The light source 108, which includes a flat-core filament, for example, can be housed either directly in the microscope base or, in the case of more powerful light sources, in its own lamp housing because of the heat generated. From there, the light generated by the light source 108 first passes through the collector 107, which includes two converging lenses, for example, and is focused by the latter.

The focused light can then enter a condenser 104 via a deflection mirror in order to be directed onto the specimen plane by the microscope's vicarious entrance pupil, i.e., a (variable) aperture stop (not shown) of the condenser 104. Care must be taken here to ensure that the aperture opening required to achieve the largest required illumination aperture, which in the maximum case is based on the objective with the highest aperture, is completely filled by the light source image. A reduction of the condenser aperture can be achieved by closing the aperture stop of the condenser accordingly.

The collector 107 images the flat-core filament of the light source 108 into the aperture stop. This aperture is in the front focus of the condenser 104, i.e., is projected by it to infinity, i.e., from each point of the light source imaged in the aperture stop plane a collimated light beam is generated in the image space of the condenser. The image space of the condenser is also the object space of the objective 102, where the specimen is also located. As a result, the aforementioned collimated rays are imaged in the image-side focus of the objective 102. This explains the important necessity of telecentric ray guidance in the object space of the microscope objective 102, which can be realized by positioning the objective aperture stop in the image-side focus of the objective 102.

The condenser 104 should also be adjusted to design a sharp image in the specimen or in the specimen/object plane to the illuminated field stop 106, which is located downstream of the collector 107. The specimen itself may rest on a carrier, which in turn rests on an object stage 103 above the condenser 104. Above the specimen is, for example, the microscope objective 102. Here it should be noted, for example, that the specimen carrier is a plane-parallel plate of normalized thickness and consists of a normalized type of glass. Only its upper surface forms the location of the specimen/object plane. For most preparations in biology and medicine, the thin object layers lie under a so-called cover glass, the thickness, and the glass types of which are just normalized. Only exemplarily the cover glass can have the cover glass correction, denoted "0.17/K5" from the geometrical glass path in mm compared to the glass type. Automatic focusing of the object is accomplished by changing the shape of the liquid lens within the microscope objective 102. Attached to the microscope objective 102, in addition to the light-deflecting prism 109, may be a tube, i.e., a tube at the upper end of which is the eyepiece 101. With the eyepiece 101, in the case of a finite optics, the real intermediate image produced by the microscope objective 102 can be viewed magnified again.

The following description and tables are drawn to an exemplary autofocusable microscope objective according to the embodiment described above. The measurements and attributes provided are for purposes of example only, and are not intended to be limiting to the scope of the invention. The variable fluid lens (VFL) is given by the components/elements numbered 6 to 13. The refractive indices and Abbe numbers of the components of the VFL described in the example are the same as those described previously. The other components/elements correspond to the components shown in FIG. 1 are indicated in below. Here, a sequential description of the objective is used to indicate that each component is represented by planes, numbered from OBJ, 1, ..., 26, IMA, and the distance between the planes (i.e., the thickness of the components). Planes nos. 4, 15, 18, 23 are the sealant surfaces/planes shown in FIG. 1.

TABLE 1

Specifications of exemplary embodiment (1)

Plan Apochromat 45x/0.50 oo/0.17 - AF
Lens focal length f' =3.60 mm
Numerical aperture NA = 0.50
Object circle diameter 2y = 0.46 mm
Wave-optical depth of field $b_{0.80}$ = +/− 1 µm (in air)

TABLE 2

Specifications of exemplary embodiment (2)

| Surf No. | Radius [mm] | Thickness [mm] | Glass n(d), v(d) |
|---|---|---|---|
| OBJ | Infinity | Infinity | |
| 1 | Infinity | 5 | |

TABLE 2-continued

Specifications of exemplary embodiment (2)

| Surf No. | Radius [mm] | Thickness [mm] | Glass n(d), v(d) |
|---|---|---|---|
| 2 | Infinity | 18.98786 | |
| 3 [L9] | 8.6135 | 2.80 [thickness L9] | 1.54739, 53.63 |
| 4 | −4.8225 | 2.20 [thickness L8] | 1.55232, 63.46 |
| 5 [L8] | 3.125 | 0.75 [air] | |
| 6 | Infinity | 0.10 | |
| 7 | Infinity | 0.90 | 1.52309, 55.42 |
| 8 | Infinity | 0.96 | 1.38417, 60.45 |
| 9 | Infinity | 0.33* | 1.38417, 60.45 |
| 10 STOP | Infinity* | 0.71* | 1.50635, 39.95 |
| 11 | Infinity | 0.20 | 1.50635, 39.95 |
| 12 | Infinity | 0.55 | 1.52309, 55.42 |
| 13 | Infinity | 0.75 | |
| 14 [L7] | −10.995 | 1.20 [thickness L7] | 1.63775, 42.41 |
| 15 | 10.447 | 1.80 [thickness L6] | 1.52855, 76.98 |
| 16 [L6] | −7.641 | 0.16 [air] | |
| 17 [L5] | 5.6636 | 2.50 [thickness L5] | 1.63775, 42.41 |
| 18 | 3.2393 | 3.50 [thickness L4] | 1.43875, 94.95 |
| 19 [L4] | −33.764 | 0.445 [air] | |
| 20 [L3] | 3.9251 | 2.28 [thickness L3] | 1.52855, 76.98 |
| 21 | −17.675 | 0.16 [air] | |
| 22 [L2] | 3.045 | 2.10 [thickness L2] | 1.52855, 76.98 |
| 23 | −2.7205 | 0.90 [thickness L1] | 1.88300, 40.76 |
| 24 [L1] | 3.1645 | 0.54705 | |
| 25 [cover] | Infinity | 0.17 | 1.51112, 60.41 |
| 26 | Infinity | 0* | |
| IMA | Infinity | | |

The system data of the objective were presented opposite to the light direction of the regular imaging (common practice for compensation-free microscope objectives), i.e., the object plane OBJ of this representation lies in infinity and IMA is the image plane of the representation corresponding to the object plane of regular application.

Surface No. 2 is the limit stop plane of the lens connection thread, the lens has a standard adjustment length of 45 mm.

The surface complex No. 6 . . . 13 forms the liquid lens "Arctic 39N0" with its variable parameters marked with an asterisk (*). Surface No. 10 is the aperture stop of the objective system and surface No. 25 is the standard cover glass. Surface No. 26 indicates the refocusing path in the air and is output in the list below together with the variable parameters of the VFL lens in five configurations (Conf.[ ]).

The thicknesses of surfaces 24 and 26 are additive.

TABLE 3

Specifications of exemplary embodiment (3)

Conf[1]: Thickness[26] = 0.0000, R[10] = Infinity,
Thickness[9] = 0.33, Thickness[10] = 0.71
Conf[2]: Thickness[26] = −0.0125, R[10] = +115.00,
Thickness[9] = 0.32, Thickness[10] = 0.72
Conf[3]: Thickness[26] = +0.0125, R[10] = −120.00,
Thickness[9] = 0.33, Thickness[10] = 0.71
Conf[4]: Thickness[26] = −0.0250, R[10] = +57.00,
Thickness[9] = 0.28, Thickness[10] = 0.76
Conf[5]: Thickness[26] = +0.0250, R[10] = −59.00,
Thickness[9] = 0.34, Thickness[10] = 0.70

The embedding or entrapment medium for the preparation can also be, for example, Canada balsam [n(d)=1.53083, v(d)=42.57]. For this example, the wave-optical depth of field $b_{0.80}$ so determined for air increases by the factor of the medium refractive index.

TABLE 4

List of reference signs:

| | |
|---|---|
| 2, 102 | Autofocusable microscope objective |
| 4 | Optical system |
| | Preparation level |
| 8 | Front group |
| 10 | Lens group |
| 11 | Aperture stop |
| G1, G2 | Lens groups |
| L1-L9 | Lenses |
| L10 | Liquid lens |
| uG1/I, uG1/O, uG2/I, uG2/O | Aperture beam angle at location G1/I, G1/O, G2/I, G2/O; |
| wG1/I, wG1/O, wG2/I, wG2/O | Main beam angle at location G1/I, G1/O, G2/I, G2/0; |
| hG1/I, hG1/O, hG2/I, hG2/O | Aperture beam height at location G1/I, G1/O, G2/I, G2/O; |
| G1/I | Input of the lens group G1; |
| G1/O | Output of the lens group G1; |
| G2/I | Input of the lens group G2; |
| G2/O | Output of the lens group G2. |
| 100 | Microscope |
| 101 | Eyepiece |
| 103 | Object table |
| 104 | Condenser |
| 105 | Deflection mirror |
| 106 | Illuminated field stop |
| 107 | Collector |
| 108 | Light source |
| 109 | Prism |
| 110 | Light beam |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An autofocusable microscope objective, comprising
an optical system comprising a plurality of optical components each formed by a lens or lens group, and an aperture stop,
wherein one of the plurality of optical components is a liquid lens to effect autofocusing of the autofocusable microscope objective by using the liquid lens to adjust the autofocusable microscope objective to a particular plane of focus in an automated manner,
wherein the liquid lens is arranged in direct vicinity of the aperture stop,
wherein the optical system comprises a stationary system in which a position of the plurality of optical components in the optical system remains unchanged, and
wherein the autofocusable microscope objective is configured such that focusing in a range of at least +/−20 wave-optical depths of field is effected by a refractive power variation of the liquid lens in a range between −2.2 and +2.2 diopters.

2. The autofocusable microscope objective according to claim 1, wherein the liquid lens is arranged in a region of the optical system in which an envelope of rays that can be coupled into the optical system is most constricted.

3. The autofocusable microscope objective according to claim 1, wherein one of the plurality of optical components of the optical system is formed as a first meniscus.

4. The autofocusable microscope objective according to claim 3, wherein the liquid lens, with respect to a propagation direction of a light beam that can be coupled into the optical system, is connected downstream of the first meniscus and all other optical components.

5. The autofocusable microscope objective according to claim 4, wherein the liquid lens is arranged in the optical system such that it occupies a position in said optical system which is natural as an aperture stop.

6. The autofocusable microscope objective according to claim 4, wherein one of the plurality of optical components of the optical system is formed as a second meniscus and the liquid lens is arranged between the first meniscus and the second meniscus.

7. The autofocusable microscope objective of claim 6, wherein the first and second menisci are aligned such that, in a refractive state of the liquid lens, an aperture and principal rays of a light beam that can be coupled into the optical system are guided such that an aperture beam angle and a principal ray angle at a light exit surface of the first meniscus are equal to or approximately equal to an aperture beam angle and a principal ray angle at a light entrance surface of a second meniscus.

8. The autofocusable microscope objective according to claim 6, wherein concave surfaces of the first and second menisci face each other.

9. The autofocusable microscope objective according to claim 6, wherein the first and/or second meniscus is formed as a putty member from at least two lenses cemented together.

10. The microscope objective according to claim 1, wherein the optical system is formed such that a diameter of an exit pupil corresponds to 0.8 to 1.3 times the diameter of a clear optical passage of the liquid lens.

11. The autofocusable microscope objective according to claim 1, wherein the autofocusable microscope objective is configured such that focusing in a range of at least +/−20 wave-optical depths of field, in particular in a range of at least +/−25 wave-optical depths of field, is effected by a refractive power variation of the liquid lens (L10) in a range between −2.2 and +2.2 diopters.

12. The autofocusable microscope objective according to claim 1, wherein at least one optical component of the optical system is such that an image formed by the autofocusable microscope objective receives a spherochromatic correction.

13. The autofocusable microscope objective according to claim 1, which is configured as a planachromat or planapochromat.

14. A microscope comprising:
an autofocusable microscope objective, comprising:
an optical system comprising a plurality of optical components each formed by a lens or lens group, and an aperture stop,
wherein one of the plurality of optical components is a liquid lens to effect autofocusing of the autofocusable microscope objective by using the liquid lens to adjust the autofocusable microscope objective to a particular plane of focus in an automated manner,
wherein the liquid lens is arranged in direct vicinity of the aperture stop, and the optical system comprises a stationary system in which a position of the plurality of optical components in the optical system remains unchanged, and
wherein the autofocusable microscope objective is configured such that focusing in a range of at least +/−20 wave-optical depths of field is effected by a refractive power variation of the liquid lens in a range between −2.2 and +2.2 diopters.

15. The microscope according to claim 14, wherein the liquid lens is arranged in a region of the optical system in which an envelope of rays that can be coupled into the optical system is most constricted.

16. The microscope according to claim 14, wherein one of the plurality of optical components of the optical system is formed as a first meniscus.

17. The microscope according to claim 16, wherein the liquid lens, with respect to a propagation direction of a light beam that can be coupled into the optical system, is connected downstream of the first meniscus and all other optical components.

18. The microscope according to claim 17, wherein the liquid lens is arranged in the optical system such that it occupies a position in said optical system which is natural as an aperture stop.

19. The microscope according to claim 17, wherein one of the plurality of optical components of the optical system is formed as a second meniscus and the liquid lens is arranged between the first meniscus and the second meniscus.

20. The microscope of claim 19, wherein the first and second menisci are aligned such that, in a refractive state of the liquid lens, an aperture and principal rays of a light beam that can be coupled into the optical system are guided such that an aperture beam angle and a principal ray angle at a light exit surface of the first meniscus are equal to or approximately equal to an aperture beam angle and a principal ray angle at a light entrance surface of the second meniscus.

* * * * *

UNITED STATES PATENT AND TRADEMARK OFFICE
CERTIFICATE OF CORRECTION

PATENT NO. : 11,693,223 B2
APPLICATION NO. : 17/401861
DATED : July 4, 2023
INVENTOR(S) : Witold Hackemer It is certified that error appears in the above-identified patent and that said Letters Patent is hereby corrected as shown below:

In the Claims

At Column 19, Claim 10, Line 29, the text, "The microscopic objective" is hereby replaced with -- The autofocusable microscopic objective --.

Signed and Sealed this
Twenty-second Day of August, 2023

Katherine Kelly Vidal
*Director of the United States Patent and Trademark Office*